US008320324B2

(12) United States Patent
Xiao

(10) Patent No.: US 8,320,324 B2
(45) Date of Patent: Nov. 27, 2012

(54) METHOD AND APPARATUS FOR GENERATING TIME-FREQUENCY PATTERNS FOR REFERENCE SIGNAL IN AN OFDM WIRELESS COMMUNICATION SYSTEM

(75) Inventor: Weimin Xiao, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/252,050

(22) Filed: Oct. 3, 2011

(65) Prior Publication Data

US 2012/0020302 A1 Jan. 26, 2012

Related U.S. Application Data

(63) Continuation of application No. 12/818,633, filed on Jun. 18, 2010.

(60) Provisional application No. 61/218,841, filed on Jun. 19, 2009.

(51) Int. Cl.
*H04W 4/00* (2009.01)
(52) U.S. Cl. ..................................................... 370/330
(58) Field of Classification Search .................... None
See application file for complete search history.

(56) References Cited

U.S. PATENT DOCUMENTS

| 2007/0087691 A1 | 4/2007 | Lee et al. | |
|---|---|---|---|
| 2008/0123592 A1 | 5/2008 | Popovic | |
| 2009/0310782 A1* | 12/2009 | Dabak et al. | 380/255 |
| 2010/0260154 A1* | 10/2010 | Frank et al. | 370/336 |

FOREIGN PATENT DOCUMENTS

| CN | 101199148 A | 6/2008 |
|---|---|---|
| WO | 2007064286 A2 | 6/2007 |
| WO | 2008150100 A1 | 12/2008 |

OTHER PUBLICATIONS

International search report & English Translation of the Written Opinion of the International Search Authority for International application No. PCT/CN2010/074150, dated Sep. 30, 2010, total 12 pages.
"3rd Generation Partnership Project;Technical Specification Group Radio Access Network;Evolved Universal Terrestrial Radio Access(E-UTRA);Physical Channels and Modulation(Release 9)," 3GPP TS 36.211,V9.0.0, Dec. 2009, 85 pages.
"Positioning Support for LTE," PR-080995, 3GPP TSG RAN#42, Athens, Greece, Dec. 2-5, 2008, 5 pages.

(Continued)

*Primary Examiner* — Yong Zhou

(57) ABSTRACT

In one embodiment, a method for a wireless communication includes generating a first time-frequency reference signal pattern at a first base station. The first time-frequency reference signal pattern includes a modified version of a mother pattern of time-frequency of a fixed size. The method further includes transmitting a first reference signal using the first time-frequency reference signal pattern.

25 Claims, 10 Drawing Sheets

OTHER PUBLICATIONS

Ericsson, "Extension to Costas arrays for PRS pattern in normal subframes," R1-092007, 3GPP TSG RAN WG 1 Meeting #57, San Francisco, CA, May 4-8, 2009, pp. 1-6.

Office action issued in corresponding U.S. Appl. No. 12/818,633, dated Dec. 22, 2011, 20 pages total.

3GPP TSG-RAN WG1#55bis R1-090353: "On OTDOA in LTE," Qualcomm Europe, Discussion and Decision, Ljubljana, Slovenia, dated Jan. 12-19, 2009, 8 pages total.

3GPP TSG-RAN WG1#57 R1-092107: "Investigation on positioning support," LG Electronics, Discussion and Decision, San Francisco, US, dated May 4-8, 2009, 10 pages total.

3GPP TSG-RAN WG1#56bis R1-091337: "Results on accuracy of OTDOA-based positioning in LTE," Motorola, Discussion, Korea, dated Mar. 23-27, 2009, 8 pages total.

European search report issued in corresponding European patent application No. 10788964.4, dated Aug. 1, 2012, 8 pages total.

* cited by examiner

METHOD AND APPARATUS FOR GENERATING TIME-FREQUENCY PATTERNS FOR REFERENCE SIGNAL IN AN OFDM WIRELESS COMMUNICATION SYSTEM

This application is a continuation of U.S. patent application Ser. No. 12/818,633, filed on Jun. 18, 2010, entitled "Method and Apparatus for Generating Time-Frequency Patterns for Reference Signal in an OFDM Wireless Communication System," which claims the benefit of U.S. Provisional Application No. 61/218,841, filed on Jun. 19, 2009, entitled "Method and Apparatus for Generating Time-Frequency Patterns for Reference Signal in an OFDM Wireless Communication System," all of which applications are hereby incorporated herein by reference.

TECHNICAL FIELD

The present invention relates generally to reference signals in a wireless communication system, and more particularly to a system and method for generating time frequency patterns for reference signals in a wireless communication system.

BACKGROUND

A great deal of effort has been directed to the location of wireless devices, most notably in support of the Federal Communications Commission's (FCC) rules for Enhanced 911 (E911). The E911 rules seek to improve the effectiveness and reliability of 911 service by providing 911 dispatchers with additional information on location of 911 calls. The implementation of E911 requires wireless carriers to provide precise location information, within 50 to 300 meters in most cases. For example, network-based systems are required to meet a precision within a range of 300 meters for about 95% of callers.

Hence, networks must design a framework for precisely but reliably locate a user end device without requiring the user end device to perform complex computations.

SUMMARY OF THE INVENTION

In one embodiment, a method for a wireless communication comprises generating a first time-frequency reference signal pattern at a first base station. The first time-frequency reference signal pattern includes a modified version of a mother pattern of time-frequency of a fixed size. The method further includes transmitting a first reference signal using the first time-frequency reference signal pattern.

In accordance with an embodiment of the present invention, a method of wireless communication comprises generating a first time-frequency reference signal pattern at a first base station. The first time-frequency reference signal pattern comprises a modified version of a mother pattern of time-frequency of a fixed size. The method further includes generating a second time-frequency reference signal pattern at a second base station. The second time-frequency reference signal pattern comprises a modified version of the mother pattern, the second time-frequency reference signal pattern being different from the first time-frequency reference signal pattern. A first reference signal using the first time-frequency reference signal pattern is transmitted from the first base station to an user equipment. A second reference signal using the second time-frequency reference signal pattern is transmitted from the second base station to the user equipment.

In yet another embodiment, a method of wireless communication comprises receiving a first reference signal having a time-frequency reference signal pattern at a mobile station. The first time-frequency reference signal pattern includes a modified version of a mother pattern of time-frequency of a fixed size. A first information about the received first reference signal is transmitted from the mobile station.

In yet another embodiment, a method of wireless communication comprises generating a first time-frequency reference signal pattern at a mobile station. The first time-frequency reference signal pattern comprises a first modified version of a mother pattern of time-frequency of a fixed size. A second time-frequency reference signal pattern is generated at the mobile station. The first time-frequency reference signal pattern is different from the second time-frequency reference signal pattern. The second time-frequency reference signal pattern comprises a second modified version of the mother pattern of time-frequency. A reference signal formed using the first and second time-frequency reference signal patterns is transmitted.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 2, which includes FIGS. 2a and 2b, illustrates an embodiment of the invention, wherein FIG. 2a illustrates a pattern generated by puncturing, and wherein FIG. 2b illustrates a pattern generated with puncturing and truncating;

FIG. 3, which includes FIGS. 3a and 3b, illustrates an alternative embodiment showing time shifting of positioning reference signals, wherein FIG. 3a illustrates a pattern for a normal cyclic prefix having a size 12×9, and wherein FIG. 3b illustrates a pattern for an extended cyclic prefix having a size of 12×7;

FIG. 4, which includes FIGS. 4a-4d, illustrates further embodiments of the invention, wherein FIGS. 4a and 4b illustrate PRS for a normal cyclic prefix subframe, and wherein FIGS. 4c and 4d illustrate PRS for an extended cyclic prefix subframe;

FIG. 5, which includes 5a and 5b, illustrates a wireless communication system in accordance with embodiments of the invention, wherein FIG. 5a illustrates a plurality of base stations communicating with a UE, and wherein

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
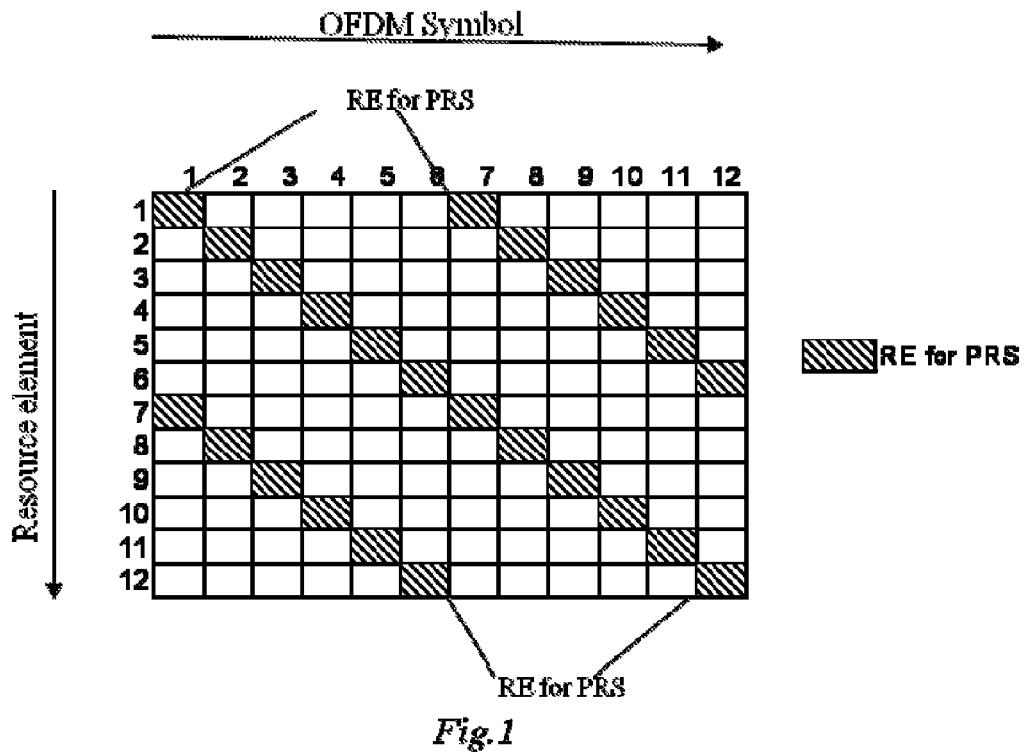
FIG. 1 illustrates a mother pattern for a PRS RE in accordance with an embodiment of the invention.

The making and using of the presently described embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Specific embodiments are described using the words user equipment (UE) and base station (BS). Other commonly used and typically interchangeable terms for UE may include mobile station, user, terminal, access terminal, subscriber, and so forth, while controller, base station, enhanced NodeB, base terminal station, and so on, may be commonly used terms for NB.

Observed time difference of arrival (OTDOA) positioning support for Long Term Evolution (LTE) aims to fulfill Federal Communications Commission (FCC) E911 requirements. In one case, the OTDOA location technique measures the time at which signals from the three or more geographically dispersed network transmitters arrive at a wireless handset. The location of the network transmitters must be known prior to the server performing the location calculation. The position of the handset is determined by comparing the time differences between at least two sets of timing measurements. However, significant challenges remain in achieving the accuracy requirements of the E911 requirements.

Positioning subframes having positioning reference signals (PRS) improve the hearability, and thereby improve positioning performance of the wireless communication system. Time-frequency pattern design is a key to the designing positioning reference signals. A time-frequency pattern defines the time-frequency resource elements (REs) that are used to transmit PRS within a time-frequency region. This time-frequency region may be a subframe, a frame, or a slot for the LTE system.

A number of schemes to generate PRS pattern have been proposed. For example, Costas pattern, Modular Sonar pattern, and E-IPDL pattern have been proposed. In addition, so that the PRS time-frequency pattern can be fit into various types of subframes, time-frequency patterns of different sizes need to be defined. In prior art proposals, patterns of different sizes are separately selected or designed. Hence, various proposals exist to define different time-frequency patterns of different sizes for various subframes, and within each proposed approach, these patterns of various sizes are independently selected.

In existing schemes, the PRS is defined as in normal subframe. Further, the network configures these positioning subframes as Multicast Broadcast Single Frequency Network (MBSFN) subframes (Rel-8) or normal subframes. The PRS is transmitted from 1 antenna port. At least one PRS RE per OFDM symbol that is not occupied by cell specific reference signal (CRS) in a PRB is used for normal subframes if only frequency reuse is supported. The MBSFN subframes have the same PRS pattern as normal subframes. A same pattern used in all PRBs is used for positioning in frequency dimension in one subframe. Practical receiver dynamic range limitations are also considered in generating the PRS. The PRS pattern is generated from a function based on PCI.

However, the PRS patterns need to be designed for various sizes to fit into various types of subframes. For example, the subframe size can vary from 12×12 to 12×7. Each proposed scheme such as Costas, Sonar, E-IPDL, etc. uses a specific algorithm which is different based on the pattern size. For example, a design for 12×12 may be different and differently obtained than another design for 12×10. Consequently, a user equipment (UE) trying to detect PRS (e.g., from multiple sectors, cells, and carriers) needs to process complex information that is beyond the capability of the UE or at least a drain on the UE's resources.

These and other problems are generally solved or circumvented, and technical advantages are generally achieved, by illustrative embodiments of the present invention.

Embodiments of the invention include selecting a mother pattern or a baseline pattern of a fixed size (for example, 12×12 or 12×10). The mother pattern is then tailored (for example, punctured or truncated) to fit into various subframes with different pattern sizes. In various embodiments, the mother pattern can be derived from different approaches, such as Costas, Modular Sonar, E-IPDL, etc., and for various reuse value (for example, 6 or 12). By using a single mother pattern, embodiments of the invention minimize the computational overhead of the UE significantly.

In various embodiments, a mother pattern of a given size is selected (e.g., 12×12). The mother pattern is then tailored to fit into various subframes. The mother pattern can be derived from different approaches, such as Costas, Sonar, etc., and for both reuse 6 and 12. The exact pattern and reuse value need to be decided by performance evaluation.

In various embodiments, truncating, puncturing or shifting, or combination of truncating, puncturing or shifting of OFDM symbols is applied for the mother pattern to fit into various subframes, such as MBSFN, subframe with synchronous channel (SCH), or broadcast channel (BCH), etc.

FIG. 1 illustrates a mother pattern for a PRS RE in accordance with an embodiment of the invention.

Referring to FIG. 1, the mother pattern can be any suitable size in various embodiments. The mother pattern is predefined within the communications system in one embodiment. As an illustration, a 12×12 pattern is shown in FIG. 1. The x-axis is OFDM symbol and is in time domain. The y-axis is resource element and in frequency domain. The mother pattern shown in FIG. 1 is a reuse 6 pattern as the PRS RE is used only every 6 REs. In other embodiments, a reuse 12 may be used.

In one embodiment, a 12×12 is the largest size possible. Hence, all the other sizes are derived from it, for example, through puncturing/truncating/shifting or a combination of them. Both reuse 6 or 12 can be used for this pattern in various embodiments. Alternatively, other maximum size can be selected for the mother pattern and all the other sizes are similarly derived from the mother pattern.

Figure 2A:
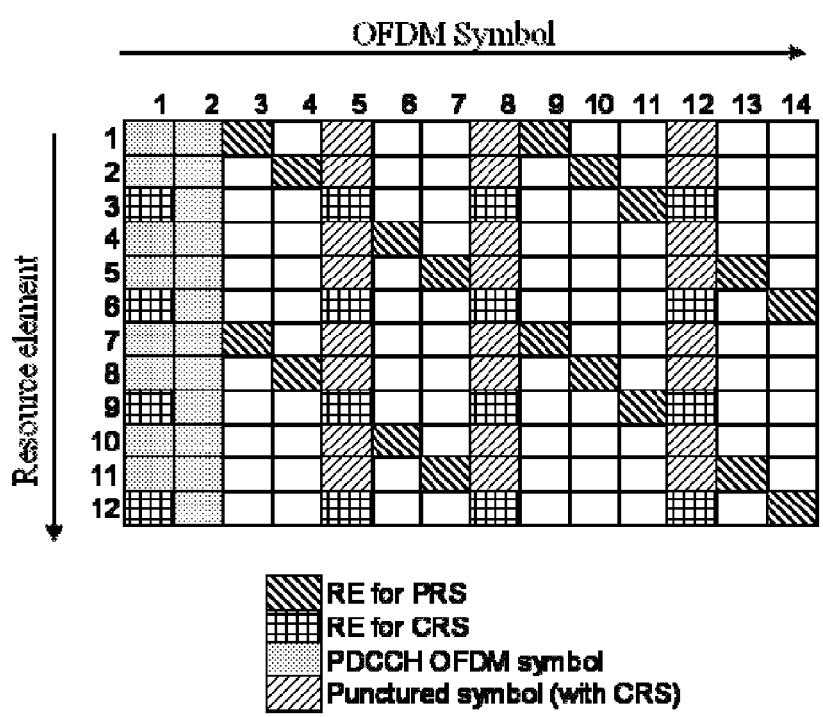
Figure 2B:
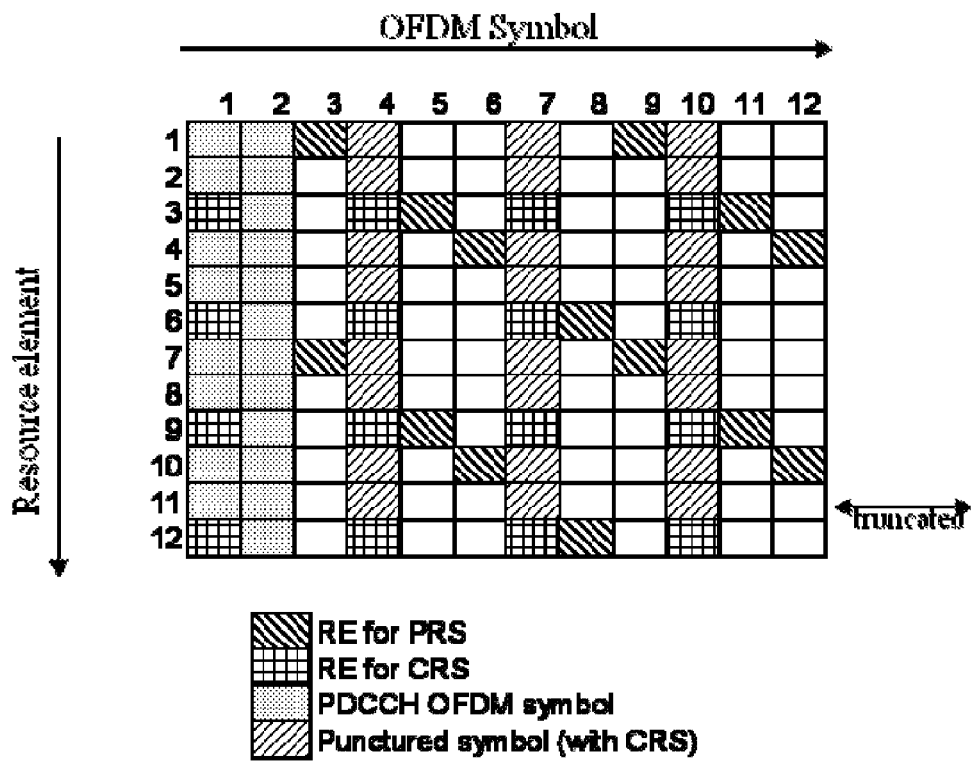

FIG. 2, which includes FIGS. 2*a* and 2*b*, illustrates an embodiment of the invention, wherein FIG. 2*a* illustrates a pattern generated by puncturing, and wherein FIG. 2*b* illustrates a pattern generated with puncturing and truncating.

FIG. 2*a* illustrates a pattern generated with puncturing and illustrates the control channel PDCCH occupying the first two columns as it has higher priority, in accordance with an embodiment of the invention. In one or more embodiments, this pattern can be used in a normal cyclic prefix subframe, for example, with 2 antennas, having a size 12×9. As illustrated in FIG. 2a, the CRS has higher priority and the PRS is not transmitted in the OFDM symbols where CRS REs are transmitted (puncturing). In puncturing, a PRS RE from the mother pattern is skipped and is not subsequently transmitted.

FIG. 2b illustrates a pattern generated with puncturing and truncating for an extended cyclic prefix subframe in accordance with an alternative embodiment. In one or more embodiments, this pattern can be used in an extended cyclic prefix subframe, for example, with 2 antennas, having a size 12×7. Unlike the prior embodiment, the PRS mother pattern is truncated. Similar to the prior embodiment, the PRS is not transmitted in the OFDM symbols where CRS REs are transmitted.

The embodiments described in FIG. 2 can be extended analogously to any other subframes with higher priority than PRS such as SCH or BCH.

Figure 3A:
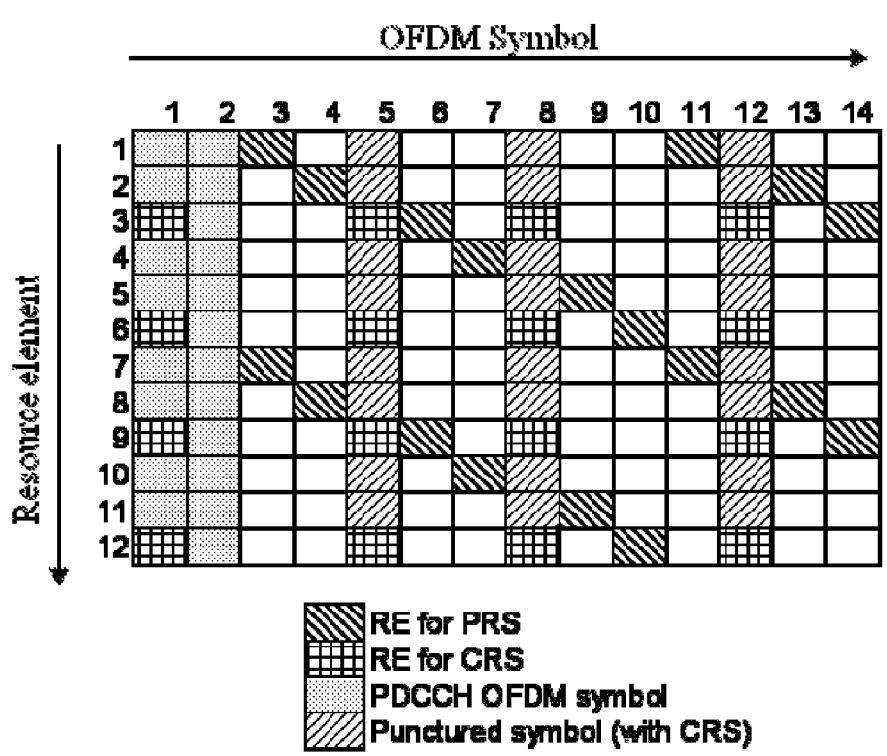
Figure 3B:
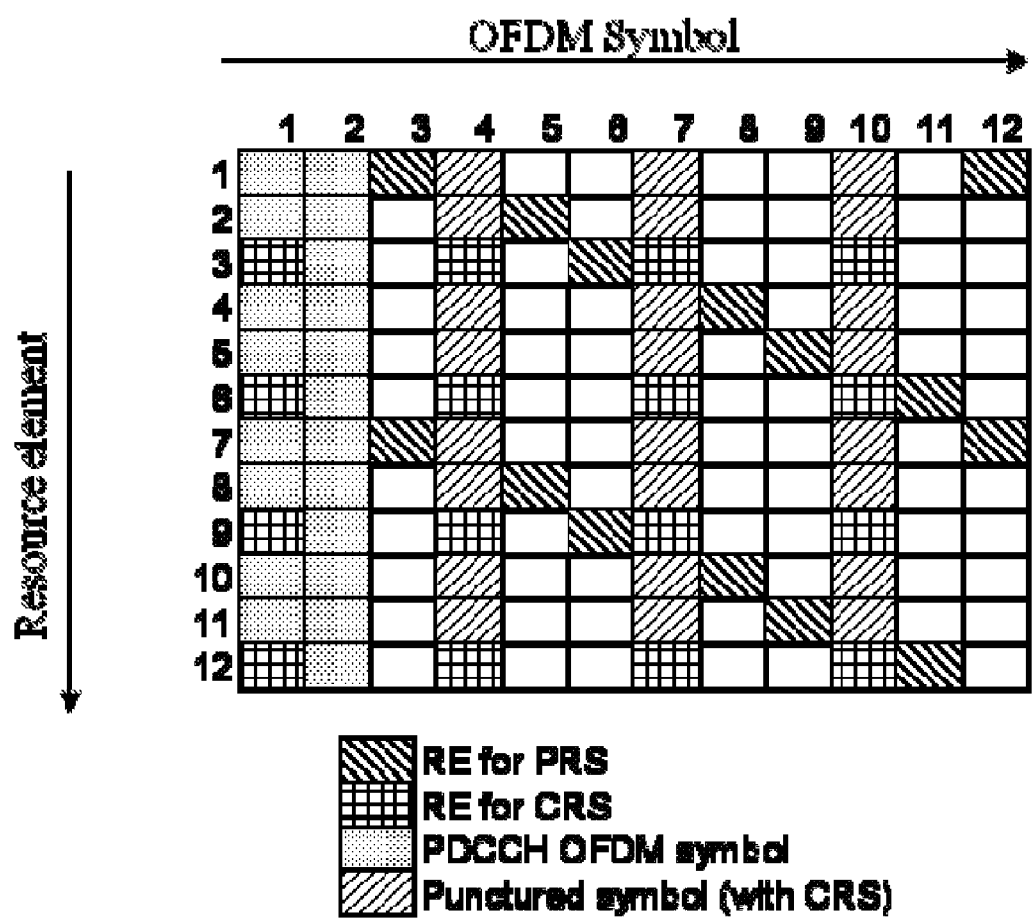

FIG. 3, which includes FIGS. 3a and 3b, illustrates an alternative embodiment showing time shifting of positioning reference signals, wherein FIG. 3a illustrates a pattern for a normal cyclic prefix having a size 12×9, and wherein FIG. 3b illustrates a pattern for an extended cyclic prefix having a size of 12×7.

In this embodiment, unlike puncturing in which the PRS RE from the mother pattern is skipped, the PRS RE is shifted to the next column. As illustrated in FIG. 3a, instead of replacing the PRS RE, for example, with a higher priority symbol, the PRS RE may be time shifted to the next column. In such an embodiment, when a CRS is encountered, the PRS RE is moved to the next symbol and the last column of the mother pattern is truncated.

Again, in an alternate embodiment for an extended cyclic prefix pattern, instead of puncturing the column of the PRS mother pattern, the PRS RE may be time shifted to the next column (FIG. 3b). In such an embodiment, when a CRS is encountered, the PRS RE is moved to the next symbol and the last column of the mother pattern is truncated.

In various embodiments, at various base stations, patterns are generated by cyclic time-frequency shifting from the master pattern. The performance in terms of collision is preserved after tailoring the mother pattern. Assume the number of REs that collide between two different time-frequency shifts of the mother pattern is n. In one embodiment, to maximize performance, after tailoring the mother pattern, this number should not be larger than n.

In various embodiments, advantageously, UE complexity is significantly reduced relative to systems using totally different patterns for various sizes. Although the patterns are changed by the base stations, the complexity is still significantly reduced because they are all generated from the same master pattern.

In various embodiments, a method for generating time-frequency reference signal patterns in an OFDM wireless communication system is disclosed. The method comprises defining a mother pattern of time-frequency with fixed size and tailoring the mother pattern to different sizes.

In one embodiment, the tailoring of the mother pattern comprises truncating one or more columns of the mother pattern in time domain. In another embodiment, the tailoring of the mother pattern comprises puncturing one or more columns of the mother pattern in time domain. In various embodiments, the puncturing of the columns of the mother pattern in time domain comprises truncating the OFDM symbols with CRS. In alternative embodiments, the puncturing of the columns of the mother pattern in time domain comprises truncating the OFDM symbols with BCCH. In one case, the puncturing of the columns of the mother pattern in time domain comprises truncating the OFDM symbols with SCH.

In another embodiment, the tailoring of the mother pattern comprises shifting one or more columns of the mother pattern in time domain. In various embodiments, the shifting of the columns of the mother pattern in time domain comprises shifting the OFDM symbols with CRS. In alternative embodiments, the shifting of the columns of the mother pattern in time domain comprises shifting the OFDM symbols with BCCH. In one case, the shifting of the columns of the mother pattern in time domain comprises shifting the OFDM symbols with SCH.

Figure 4A:
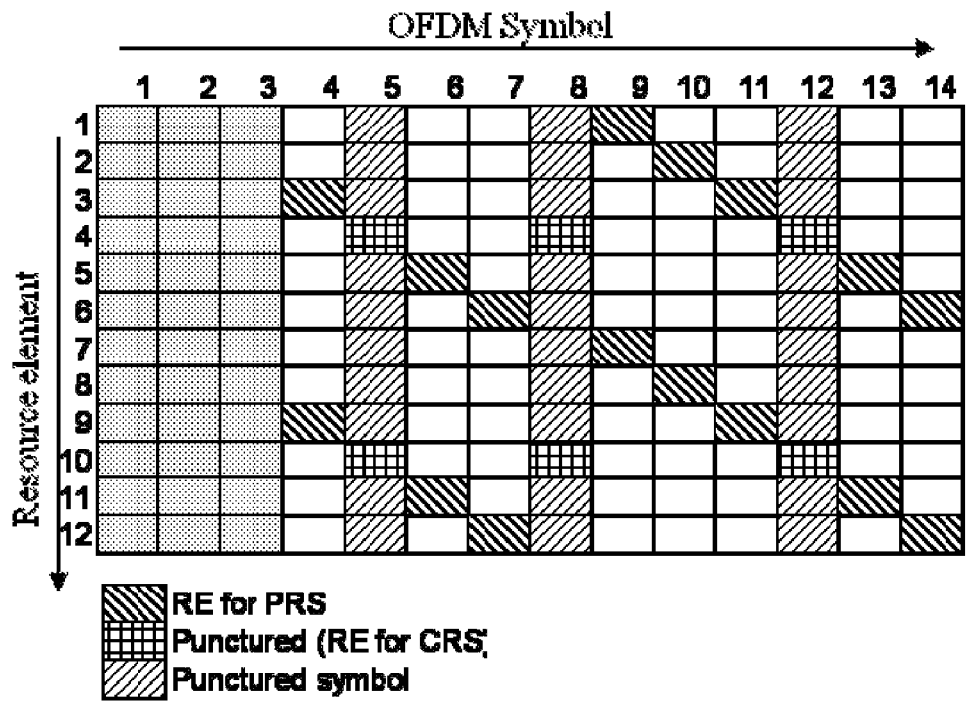
Figure 4B:
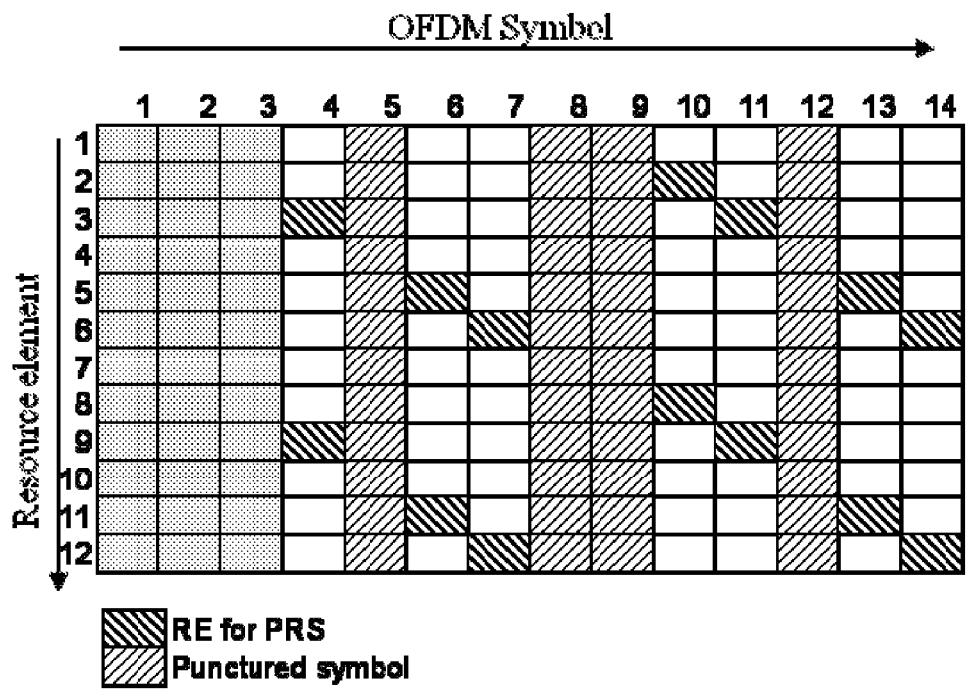
Figure 4C:
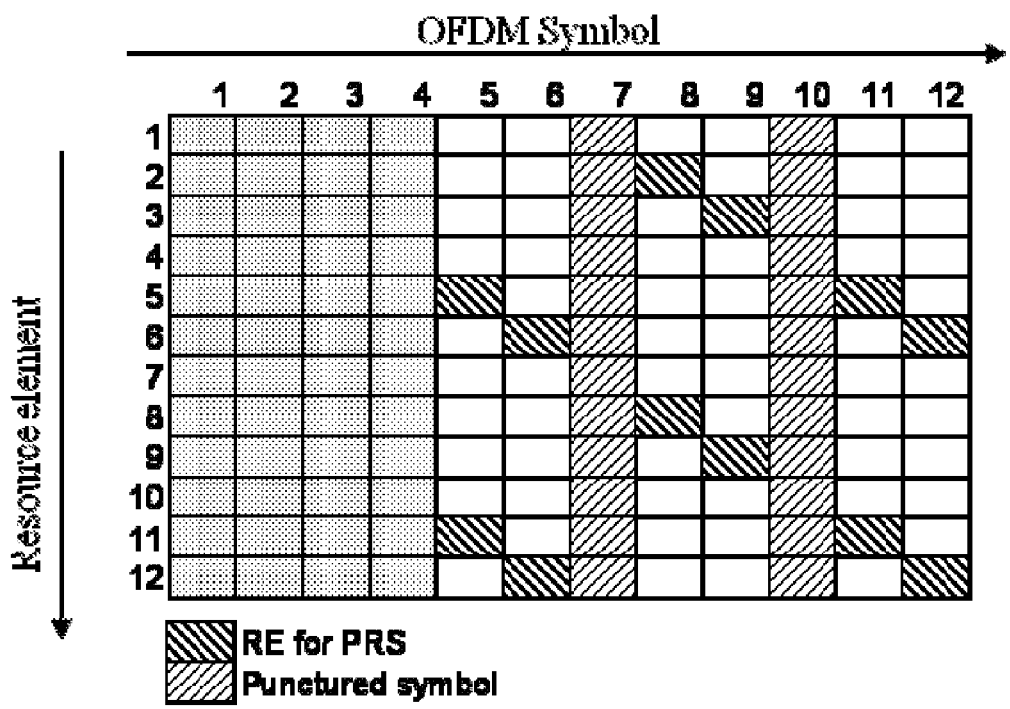
Figure 4D:
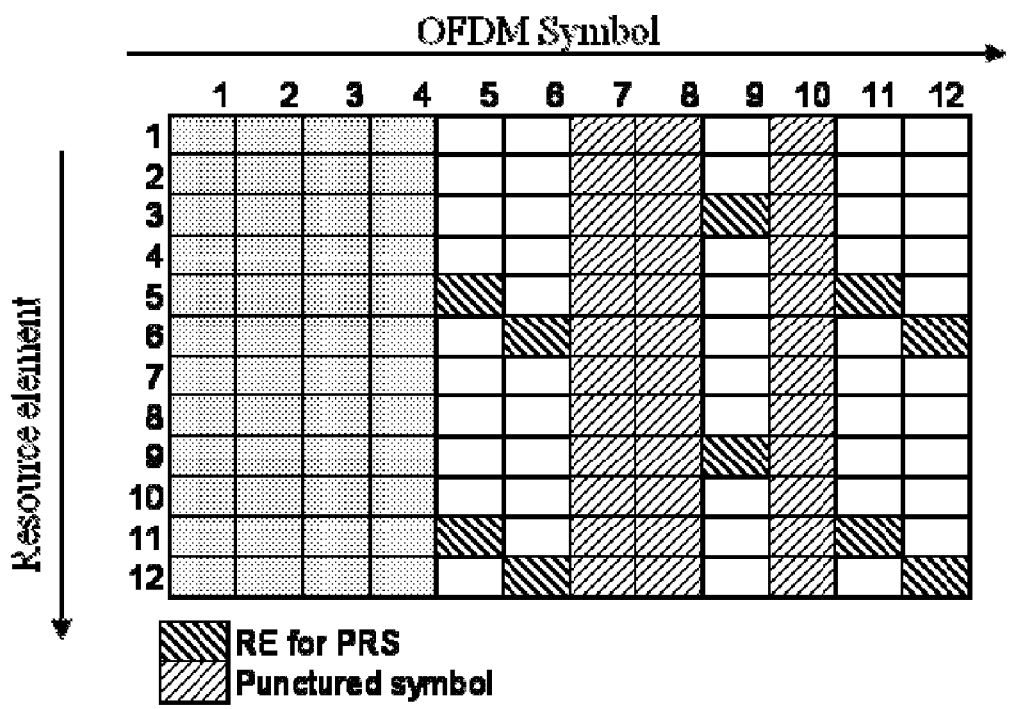

FIG. 4, which includes FIGS. 4a-4d, illustrate further embodiments of the invention, wherein FIGS. 4a and 4b illustrate PRS for a normal cyclic prefix subframe, and wherein FIGS. 4c and 4d illustrate PRS for an extended cyclic prefix subframe. FIG. 4 illustrates the combination of embodiments described in FIGS. 2 and 3.

Referring to FIGS. 4a and 4b, the subframe for a normal cyclic prefix is divided into two time slots (columns 1-7 and columns 8-14) thereby forming timeslots of 7×12. In various embodiments, as described below, the mother pattern is modified differently for the two timeslots. FIG. 4a illustrates a mapping of positioning reference signals for one or two antennas. As described in prior embodiments, the first three columns are allotted for control channel PDCCH as it has higher priority. Therefore, no PRS RE are allotted to the first three columns. The PRS RE of the mother pattern are therefore punctured and shifted as shown in FIG. 4a.

The CRS has higher priority and therefore PRS is not transmitted in the OFDM symbols where CRS REs are transmitted. Consequently, column 5 is punctured. The position of the CRS REs is illustrated merely as an example. The position of the CRS REs may be allotted differently in other embodiments.

In the second timeslot, similarly, column 8 is reserved for CRS REs and therefore, the PRS are shifted. Again, column 12 is reserved for CRS REs and the mother pattern is punctured. Remaining PRS of the mother pattern are truncated to fit within the timeslot.

FIG. 4b illustrates a mapping of positioning reference signals for three or four antennas. The first timeslot is similar to FIG. 4a. In the second timeslot, column 9 is punctured for a higher priority signal such as CRS REs.

Referring to FIGS. 4c and 4d, the subframe for an extended cyclic prefix is divided into two time slots (columns 1-6 and columns 7-12) thereby forming timeslots of 6×12.

FIG. 4c illustrates a mapping of positioning reference signals for one or two antennas for the extended cyclic prefix subframe. As described in prior embodiments, the first four columns are allotted for control channel PDCCH as it has higher priority. Therefore, no PRS RE are allotted to the first four columns. The PRS RE of the mother pattern are therefore punctured as shown in FIG. 4c. In the second timeslot, similar to other embodiments, columns 7 and 10 are reserved for CRS REs and therefore, the PRS of the mother pattern are punctured. Remaining PRS of the mother pattern are truncated.

FIG. 4d illustrates a mapping of positioning reference signals for three or four antennas for the extended cyclic prefix subframe. The first timeslot is similar to FIG. 4a. In the second timeslot, besides column 7 and 10 as in FIG. 4c, column 8 is also punctured for a higher priority signal such as CRS REs.

Figure 5A:
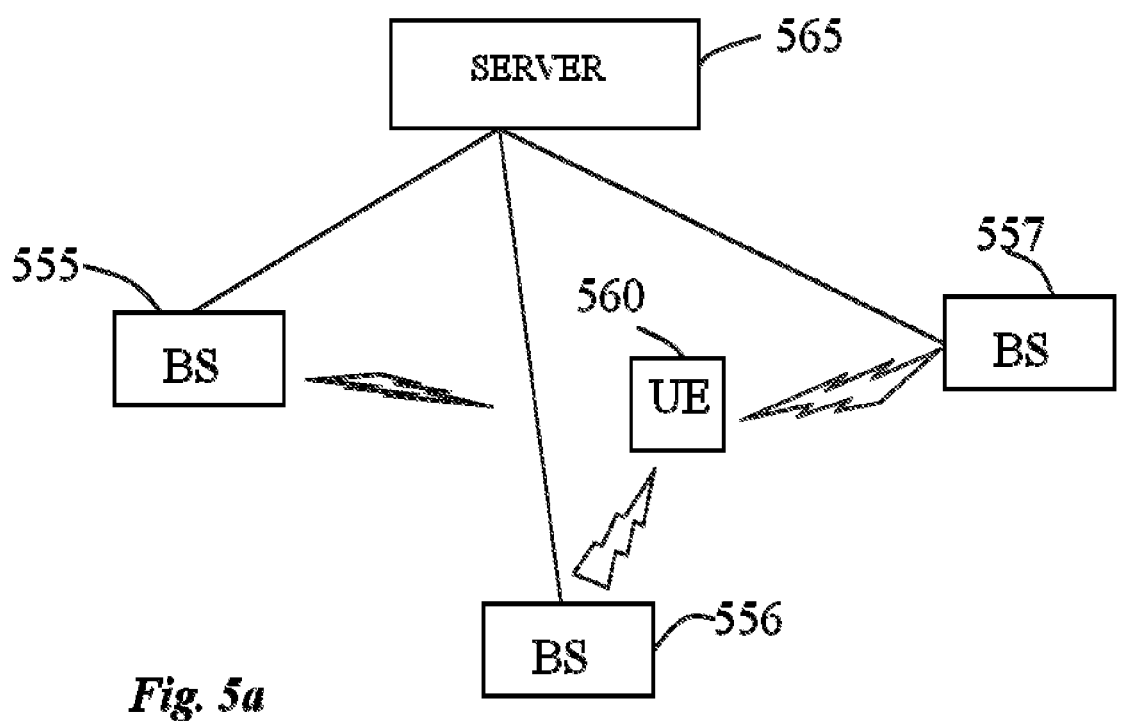
Figure 5B:
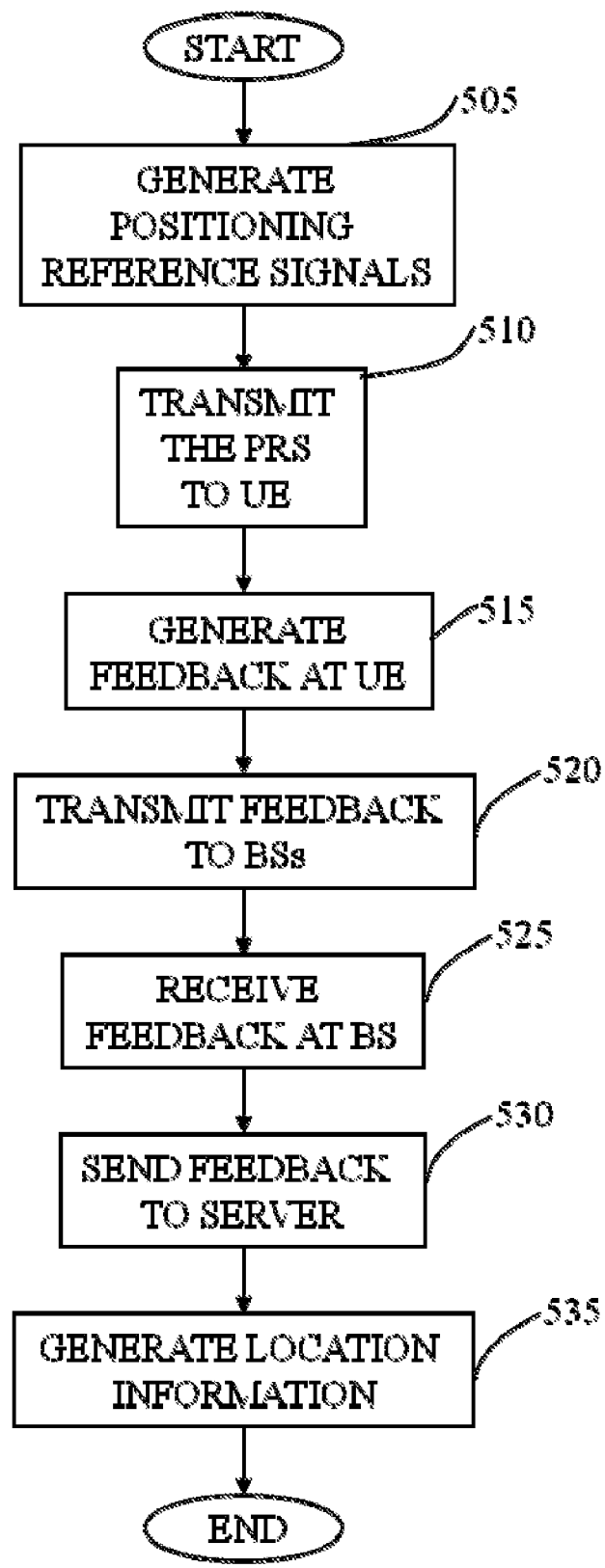
FIG. 5b illustrates the operation of the communication system.

FIG. 5, which includes 5a and 5b, illustrates a wireless communication system in accordance with embodiments of the invention, wherein FIG. 5a illustrates a plurality of base stations communicating with a UE, and wherein FIG. 5b illustrates the operation of the communication system.

Referring to FIG. 5a, the communication system comprises a first BS 555, a second BS 556, a third BS 557 communicating with a UE 560. The first, the second, and the third BSs 555, 556, 557 generate a first, a second, a third PRSs (block 505 in FIG. 5b). The first BS 555 transmits a first PRS to the UE 560. The second BS 556 transmits a second PRS to the UE 560, and the third BS 557 transmits a third PRS to the UE 560 (block 510). In various embodiments, the PRSs are generated as described in embodiments of the invention described above.

In various embodiments, more or less number of BS may be used. The UE 560 measures each of the first, the second, and the third PRS signals and generate feedback (block 515). The feedback is transmitted back to the respective BS (block 520). Alternatively, the UE may transmit the collected information to a single BS.

The BS collects the transmitted feedback information (block 525) and sends it to a server 565 (block 530), which determines the time difference of arrival (OTDOA) between the first, the second, and the third PRS signals. Because the server 565 knows the location of the first, the second, and the third BS 555, 556, and 557, the controller 565 can determine the location of the UE 560 precisely (block 535). In some embodiments, one of the BS may collect the feed back information from the remaining BSs and determine the location of the UE 560.

In alternative embodiments, the position reference signals may be implemented such that a plurality of BS such as first, the second, and the third BS 555, 556, and 557 receive a reference signal such as a PRS pattern from a UE such as UE 560. The UE generates the RS pattern as described in various embodiments. For example, the UE may use a table lookup to generate a RS pattern, which is a modified version of a mother pattern having a fixed size. The RS pattern, which is the modified version of the mother pattern, has a size smaller than the fixed size mother pattern. As described in various embodiments, the modified version of the mother pattern, may be formed after puncturing, shifting, and/or truncating columns of the mother pattern.

Figure 6:
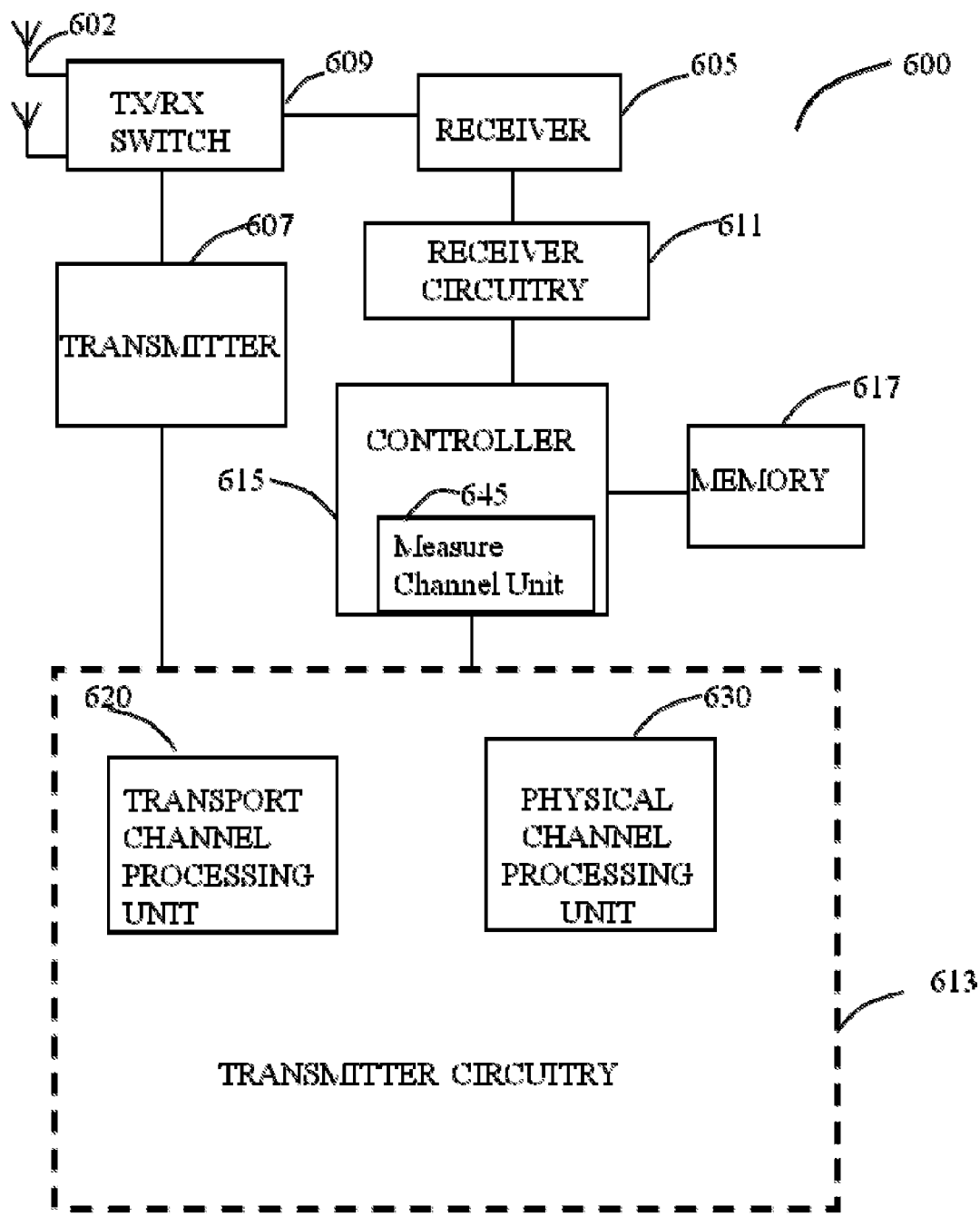
FIG. 6 illustrates a user equipment in accordance with embodiments of the invention.

FIG. 6 illustrates an user equipment UE 600 in accordance with embodiments of the invention. UE 600 may be representative of a UE receiving the PRS and transmitting this information back to a base station as discussed in various embodiments. UE 600 may receive multiple transmissions from any number of access points such as from three spatially separated access points.

UE 600 may have at least two antennas 602. Antennas 602 may serve as both a transmit antennas and a receive antennas and operated through a TX/RX switch 609. Alternatively, UE 600 may have separate transmit and receive antennas. UE 600 may have equal numbers of transmit antennas and receive antennas or UE 600 may have a different number of transmit antennas and receive antennas.

Coupled to antennas 602 may be a transmitter 607 used to transmit information over the air using antennas 602. A transmitter circuitry 613 is coupled to the transmitter 607 and provides signal processing for information being transmitted. Examples of signal processing provided by transmitter circuitry 613 may include filtering, amplifying, modulating, error encoding, parallel-to-serial converting, interleaving, bit puncturing, and so forth. For example, the transmit circuitry 613 includes a transport channel processing unit 620 and a physical channel processing unit 630 as described below with respect to FIG. 8.

Also coupled to antennas 602 may be a receiver 605 used to receive information detected by antennas 602. A receiver circuitry 611 is coupled to the receiver 605 and provides signal processing for the received information. Examples of signal processing provided by the receiver circuitry 611 may include filtering, amplifying, demodulating, error detecting and correcting, serial-to-parallel converting, de-interleaving, and so on.

A controller 615 may be a processing unit responsible for executing applications and programs, controlling operations of various components of the UE 600, interacting with base stations, relay nodes, and so forth. In addition to the above listed operations, controller 615 may be responsible for computing information from the PRS transmissions to UE 600. UE 600 also includes a memory 617 for storing applications and data, including information relating to the PRS transmissions. Controller 615 includes functional blocks such as a measure position unit 645 that may be used to measure the PRS signals received from base stations.

Measure position unit 645 may be used to measure a position between UE 600 and each access point transmitting to UE 600. Measurements of the position may be based on pilot signals such as PRS described above, reference sequences, or other transmissions made by the access points. The measure position unit 645 may be part of a hardware circuitry, for example, a digital signal processor, or part of a code stored in the memory 617 which is subsequently executed in the controller 615.

Figure 7:
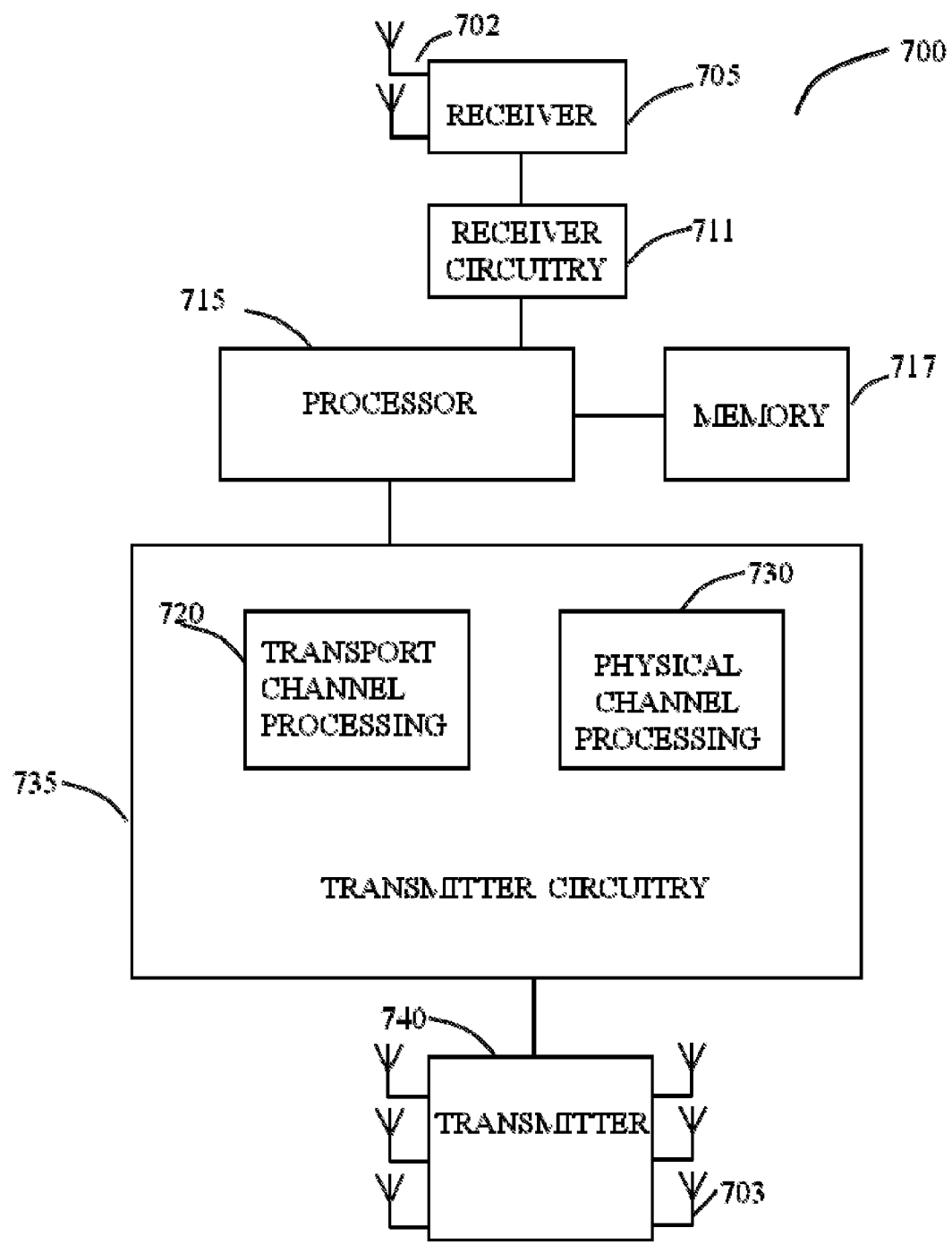
FIG. 7 illustrates a base station in accordance with embodiments of the invention.

FIG. 7 illustrates a communications device 700 in accordance with embodiments of the invention. Communications device 700 may be a base station communicating using spatial multiplexing on a DL.

A receiver 705 is coupled to receiver antennas 702 used to receive information detected by receiver antennas 702. A receiver circuitry 711 is coupled to the receiver 705 and provides signal processing for the received information. Examples of signal processing provided by the receiver circuitry 711 may include filtering, amplifying, demodulating, error detecting and correcting, serial-to-parallel converting, de-interleaving, and so on. For example, these may be implemented in a digital signal processing chip or other signal processing chips. Alternately, some or all of the signal processing may be stored in the memory and executed in a processor 715.

Communications device 700 further includes a processor 715 that may be used to execute applications and programs. The processor 715 is coupled to a memory 717, which may also be used for storing applications and data, including information relating to the PRS transmissions. Communications device 700 includes a receive chain coupled to receiver antennas 702 and a transmit chain coupled to transmit antennas 703.

The transmit chain of communications device 700 includes a transmitter circuitry 735 having a transport channel processing unit 720 that may provide transport channel processing such as applying CRC data to a transport block, segmenting, channel coding, rate matching, concatenating, and so on, to information to be transmitted.

The transmitter circuitry 735 further includes a physical channel processing unit 730, and a transmitter 540. Physical channel processing unit 730 may provide other physical channel processing such as scrambling, modulation/coding scheme selection and mapping, codeword-to-layer mapping function, signal generating, and so forth. The physical channel processing unit 730 generates PRS signals as described in various embodiments. The transmitter circuitry 375 may be implemented as a separate chip such a signal processing chip or part of an integrated chip. In alternative embodiments, the transmitter circuitry 375 may be implemented using software code stored in the memory 717 of the communication device 700 and subsequently executed on a processor 715.

In alternative embodiments in which the UE generates the RS signals, the above functionality of the physical channel processing unit 730 may be formed part of the UE, for example, within the physical channel processing unit 630 of the transmitter circuitry 613 of the UE described in FIG. 6.

Transmitter circuitry 735 may further provide processing such as parallel to serial converting, amplifying, filtering, and so on. Transmitter 740 transmits the information to be transmitted using one or more transmit antennas 703.

In various embodiments, a communications device comprises a processing unit configured to generate a first time-frequency reference signal pattern of a first size. The first time-frequency reference signal pattern comprises a modified version of a mother pattern of time-frequency of a fixed size, wherein the first size is smaller than the fixed size. A transmitter is configured to transmit the first time-frequency reference signal pattern. The communications device further comprises a receiver configured to receive information about the received first time-frequency reference signal pattern. In one or more embodiments, the modified version of the mother pattern comprises a first column of the mother pattern punctured in time domain, a second column of the mother pattern shifted in time domain, and a third column of the mother pattern truncated in time domain. In one embodiment, the first column comprises OFDM symbols with cell specific reference signal (CRS). In another embodiment, a column having OFDM symbols with cell specific reference signal (CRS) immediately precedes the second column.

Figure 8:
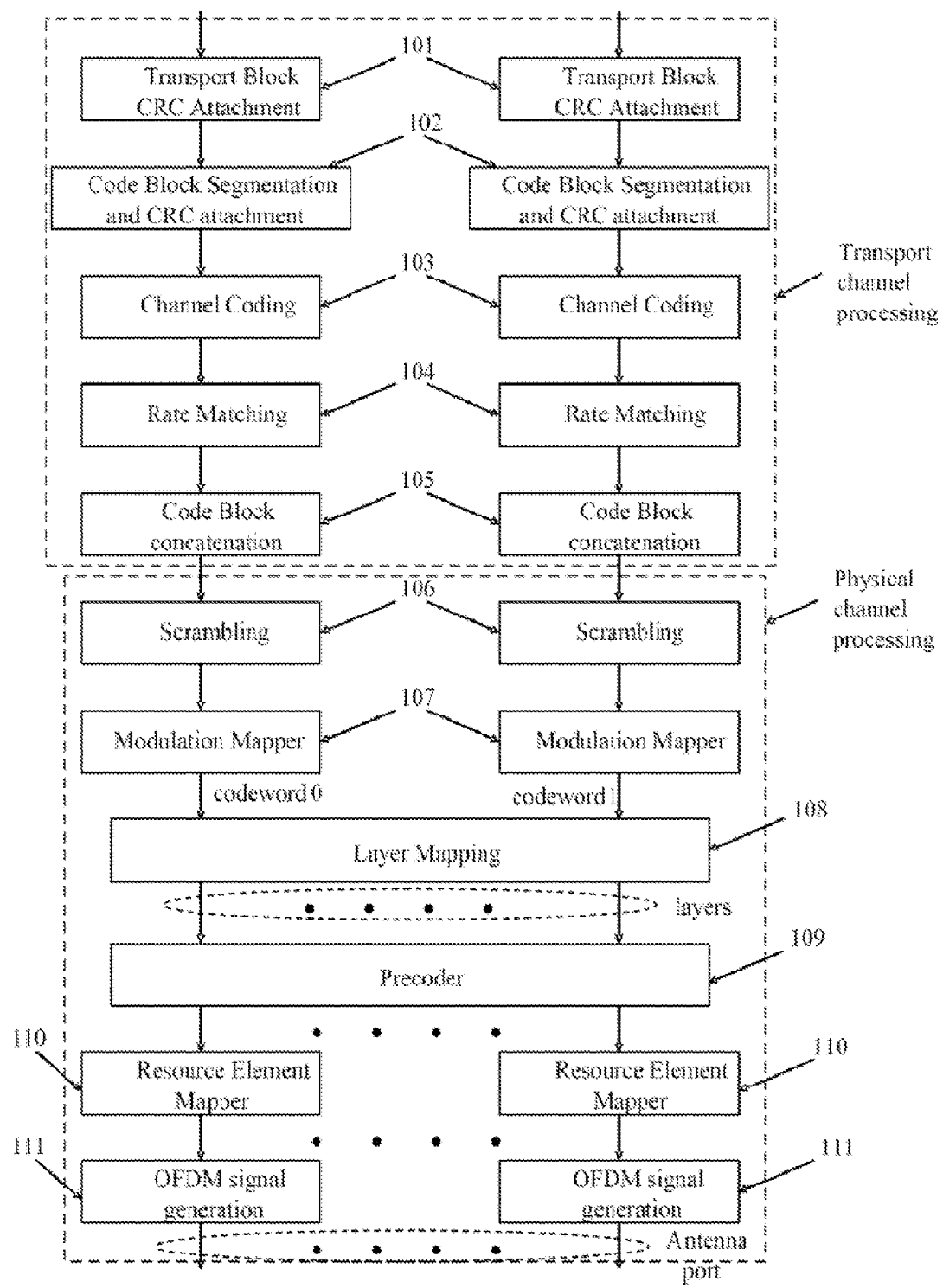
FIG. 8 is a flow diagram of a downlink physical layer processing and illustrates the implementation of embodiments of the invention.

FIG. 8 is a flow diagram of a downlink physical layer processing and illustrates the implementation of embodiments of the invention. For clarity, FIG. 8 illustrates both the transport channel processing and the physical channel processing.

As illustrated in FIG. 8, in the transport channel processing, for each transport block (TB), a cyclic redundancy check (CRC) is attached to the TB at Transport block CRC attachment unit 101. If the size of the TB is larger than a preset threshold, Code block segmentation and Code block CRC attachment unit 102 is used to split the TB into multiple code blocks (CB) and a CRC is attached to each CB. If the TB is not larger than the preset threshold, then the TB may not be split into multiple CBs and the output of unit 101 are sent to unit 103.

Then, each CB is turbo-encoded in Channel Coding unit 103. In Rate matching unit 104, the coded bits of each CB is interleaved and the redundancy version (RV) for hybrid automatic repeat request (HARM) is obtained from high layer signaling. The CBs may be concatenated in a Code block concatenation unit 105.

As illustrated under physical channel processing, coded symbols to be transmitted are scrambled in a Scrambling unit 106 to randomize the transmission bits. Before mapping codewords to layers, the scrambled bits may be modulated into complex-valued symbols using Quadrature Phase Shift Keying (QPSK), 16 Quadrature Amplitude Modulation (QAM) or 64 QAM in a Modulation Mapper unit 107. The complex-valued modulation symbols for each codeword to be transmitted are mapped onto one or several layers in a Layer Mapping unit 108. While, a Precoder unit 109 takes as input the vector comprising one complex-valued modulation symbol from each layer and generates a block of vector to be mapped onto resources on each of the antenna ports.

In a Resource Element Mapper unit 110, the precoded symbols are mapped into time-frequency domain resource element of each antenna port. The Resource Element Mapper Unit 110 implements embodiments of the invention described above. In particular, PRS are allotted into the into time-frequency domain resource element of a port if no other reference signal, such as cell reference signal, of higher priority is assigned. Further, PRS are not allotted to control channel. The PRS are allotted by superimposing a mother pattern as described in embodiments above. The PRS mother pattern is punctured, time shifted, and/or truncated in allocating PRS to the time-frequency domain resource element of a port. In various embodiments, the Resource Element Mapper unit 110 may be implemented as a signal processing chip such a digital signal processing chip, or as a software code stored in the memory and executed through a common processor.

The mapped symbols are then converted to orthogonal frequency division multiplexing (OFDM) baseband signal in an OFDM signal generation unit 111. The baseband signal is then upconverted to a carrier frequency for each antenna port.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for a wireless communication comprising:
generating a first time-frequency reference signal pattern at a first base station, the first time-frequency reference signal pattern comprising a modified version of a mother pattern of time-frequency of a fixed size with a plurality of columns, each column including a plurality of resource elements (REs), wherein the modified version of the mother pattern has an entire column of REs including at least one RE allocated for cell specific reference signal (CRS) punctured in time domain; and
transmitting a first reference signal using the first time-frequency reference signal pattern.

2. The method of claim 1, further comprising:
generating a second time-frequency reference signal pattern at the first base station, wherein the second time-frequency reference signal pattern comprises a modified version of the mother pattern; and
transmitting a second reference signal using the second time-frequency reference signal pattern.

3. The method of claim 1, further comprising:
generating a second time-frequency reference signal pattern at a second base station, wherein the second time-frequency reference signal pattern comprises a modified version of the mother pattern; and
transmitting a second reference signal using the second time-frequency reference signal pattern.

4. The method of claim 3, further comprising:
receiving the first reference signal at a mobile station; and
receiving the second reference signal at the mobile station.

5. The method of claim 4, wherein the mobile station uses the first reference signal to identify a geographic location of the mobile station.

6. The method of claim 1, wherein the first time-frequency reference signal pattern defines the time-frequency resource elements on which a reference signal is transmitted.

7. The method of claim 6, wherein the first time-frequency reference signal pattern is the time-frequency pattern of a positioning reference signal.

8. The method of claim 1, wherein the modified version of the mother pattern comprises one or more columns of the mother pattern truncated in time domain.

9. The method of claim 1, wherein the column of the mother pattern punctured in time domain comprises a column having REs allocated for broadcast channel (BCCH) or synchronous channel (SCH).

10. The method of claim 1, wherein the modified version of the mother pattern comprises columns of the mother pattern shifted in time domain.

11. The method of claim 10, wherein the modified version of the mother pattern comprises REs allocated for CRS in a column immediately preceding the column of the mother pattern shifted in time domain.

12. The method of claim 10, wherein the modified version of the mother pattern comprises REs allocated for broadcast channel (BCCH) or synchronous channel (SCH) in a column immediately preceding the column of the mother pattern shifted in time domain.

13. The method of claim 1, wherein the generating a first time-frequency reference signal pattern comprises looking up a pattern from a list of stored patterns.

14. The method of claim 1, wherein the first time-frequency reference signal pattern excludes any other RE in the punctured column allocated for position reference signal (PRS).

15. A method for a wireless communication, the method comprising:
receiving a first reference signal having a first time-frequency reference signal pattern at a mobile station, the first time-frequency reference signal pattern comprising a modified version of a mother pattern of time-frequency of a fixed size with a plurality of columns, each column including a plurality of resource elements (REs), wherein the modified version of the mother pattern has an entire column of REs including at least one RE allocated for cell specific reference signal (CRS) punctured in time domain; and
transmitting first information about the received first reference signal from the mobile station.

16. The method of claim 15, further comprising:
receiving a second reference signal having a second time-frequency reference signal pattern at the mobile station, the second time-frequency reference signal pattern comprising a modified version of the mother pattern of time-frequency; and
transmitting second information about the received second reference signal.

17. The method of claim 15, wherein the modified version of the mother pattern comprises one or more columns of the mother pattern truncated in time domain.

18. The method of claim 15, wherein the column of the mother pattern punctured in time domain comprises a column having REs allocated for broadcast channel (BCCH) or synchronous channel (SCH).

19. A communication device in wireless communication system comprising:
a processing unit, configured to generate a first time-frequency reference signal pattern at a first base station, the first time-frequency reference signal pattern comprising a modified version of a mother pattern of time-frequency of a fixed size with a plurality of columns, each column including a plurality of resource elements (REs), wherein the modified version of the mother pattern has an entire column of REs including at least one RE allocated for cell specific reference signal (CRS) punctured in time domain; and
a transmitter coupled to one or more antennas, configured to transmit a first reference signal using the first time-frequency reference signal pattern.

20. The communication device of claim 19, further comprising:
a receiver coupled to one or more antennas, configured to receive the first reference signal from a mobile station.

21. The communication device of claim 19, further comprising:
a memory, configured to store applications and data.

22. A mobile station in wireless communication system comprising:
a receiver coupled to one or more antennas, configured to receive a first reference signal having a first time-frequency reference signal pattern at the mobile station, the first time-frequency reference signal pattern comprising a modified version of a mother pattern of time-frequency of a fixed size with a plurality of columns, each column including a plurality of resource elements (REs), wherein the modified version of the mother pattern has an entire column of REs including at least one RE allocated for cell specific reference signal (CRS) punctured in time domain; and
a transmitter, configured to transmit first information about the received first reference signal from the mobile station.

23. The mobile station of claim 22, wherein
the receiver is further configured to receive a second reference signal having a second time-frequency reference signal pattern at the mobile station, the second time-frequency reference signal pattern comprising a modified version of the mother pattern of time-frequency; and
the transmitter is further configured to transmit second information about the received second reference signal.

24. The mobile station of claim 22, wherein the modified version of the mother pattern comprises one or more columns of the mother pattern truncated in time domain.

25. The mobile station of claim 22, wherein the column of the mother pattern punctured in time domain comprises a column having REs allocated for broadcast channel (BCCH) or synchronous channel (SCH).

* * * * *